US009038785B2

(12) United States Patent
Lin

(10) Patent No.: US 9,038,785 B2
(45) Date of Patent: May 26, 2015

(54) CASTOR WITH SEPARATE BRAKE DEVICE AND BRAKE RELEASE DEVICE

(71) Applicant: Qing-Song Lin, Yunlin County (TW)

(72) Inventor: Qing-Song Lin, Yunlin County (TW)

(73) Assignee: CATIS PACIFIC MFG. CORP. LTD., Yunlin County (TW)

( * ) Notice: Subject to any disclaimer, the term of this patent is extended or adjusted under 35 U.S.C. 154(b) by 84 days.

(21) Appl. No.: 14/045,817

(22) Filed: Oct. 4, 2013

(65) Prior Publication Data

US 2015/0096845 A1 Apr. 9, 2015

(51) Int. Cl.
*B60B 33/00* (2006.01)
*B60B 33/02* (2006.01)

(52) U.S. Cl.
CPC ........... *B60B 33/021* (2013.01); *B60B 33/0081* (2013.01); *B60B 33/025* (2013.01)

(58) Field of Classification Search
USPC ........................ 188/1.12, 19, 29, 31; 16/35 R
See application file for complete search history.

(56) References Cited

U.S. PATENT DOCUMENTS

| | | | | |
|---|---|---|---|---|
| 4,035,864 A * | 7/1977 | Schroder | ........................ | 16/35 R |
| 6,810,560 B1 * | 11/2004 | Tsai | .............................. | 16/35 R |
| 6,854,567 B2 * | 2/2005 | Suzuki | ......................... | 188/1.12 |
| 8,220,110 B1 * | 7/2012 | Chen | ............................. | 16/35 R |

* cited by examiner

*Primary Examiner* — Christopher Schwartz
(74) *Attorney, Agent, or Firm* — Patent Office of Bang Shia

(57) ABSTRACT

A castor with separate brake device and brake release device is provided with a shell, a brake piece, a brake unit and a brake-release unit. The brake unit and the brake-release unit are two separate members, while they are interactively linked by a push portion and the notch portion, so as to ensure the accuracy of the brake operation. Whenever the castor is in a brake-activated status or brake-deactivated status, the brake pedal and the brake-release pedal pivot in opposite direction to present different angles, which makes it easier for the user to see the status of the castor (in brake position or non-brake position), and prevents confusion or accidental operation.

10 Claims, 7 Drawing Sheets

30 31 33 32 34 22 20 40 41 61 21 50 70 60 64 65 90 92 91 915 913 812 815 811 912 911 83 816 914 813 63 814 62 82 81 80

CASTOR WITH SEPARATE BRAKE DEVICE AND BRAKE RELEASE DEVICE

BACKGROUND OF THE INVENTION

1. Field of the Invention

The present invention relates to a castor for furniture, and more particularly to a castor with separate brake device and brake release device.

2. Description of the Prior Art

Castors are fixed at the bottom of furniture for easy moving, and most of the castors are provided with brake device for positioning of the furniture.

As shown in FIG. 1, a conventional castor 10 with brake device comprises: a hollow shell 11 in which being provided a wheel 12, a toothed disc 13, a brake piece 14 and a pedal 15. The brake piece 14 has two ends located at the toothed disc 13 and the pedal 15, respectively. Pushing the pedal 15 down can make one end of the brake piece 14 press against the wheel 12 and make another end of the brake piece 14 tilt up and engage with toothed disc 13 to provide a brake action. To release the brake, it also has to press down the pedal 15 again, and the pedal 15 pivots away from the brake piece 14, and then the brake piece 14 moves away from the wheel 12 to release the brake.

Initiating and releasing the brake all require pressing down the pedal 15, which is likely to cause confusion or accidental operation, or even safety concerns.

The present invention has arisen to mitigate and/or obviate the afore-described disadvantages.

SUMMARY OF THE INVENTION

The primary objective of the present invention is to provide a castor with separate brake device and brake release device, which allows the user to easily see the status of the castor (in brake position or non-brake position), and prevents confusion and accidental operation.

To achieve the above objective, a castor with separate brake device and brake release device in accordance with the present invention comprises: a shell, a brake piece, a brake unit and a brake-release unit.

The shell includes two lateral pieces, a shaft is pivotally inserted through the shell and has one end extending out of the shell, a toothed disc is pivotally disposed between the two lateral pieces and fixed to another end of the shaft and including a toothed portion.

The brake piece includes a pivot portion formed between two ends thereof and pivotally disposed between the two lateral pieces. A plurality of teeth at one end of the brake piece is located corresponding to the toothed portion of the toothed disc, and two brake portions at another end of the brake piece is located corresponding to the wheel.

The brake unit includes a brake pedal. One end of the brake pedal is pivotally disposed between the two lateral pieces and formed with a push portion, a restricting portion in the form of a protruding tooth, and a press portion in the form of a protruding tooth. Between the push portion and the restricting portion is formed a concave portion, between two ends of the brake pedal is a positioning concave, the press portion of the brake pedal is located corresponding to the brake portions of the brake piece.

The brake-release unit includes a brake-release pedal, and one end of the brake-release pedal is pivotally disposed between the two lateral pieces, and another end of the brake-release pedal is formed with an L-shaped engaging portion. One surface of the brake-release pedal is formed with a notch portion and protruding portion, the protruding portion of the brake-release pedal is located in the concave portion of the brake pedal, and the engaging portion of the brake-release pedal is located corresponding to the positioning concave of the brake pedal.

DETAILED DESCRIPTION OF THE PREFERRED EMBODIMENTS

Figure 1:
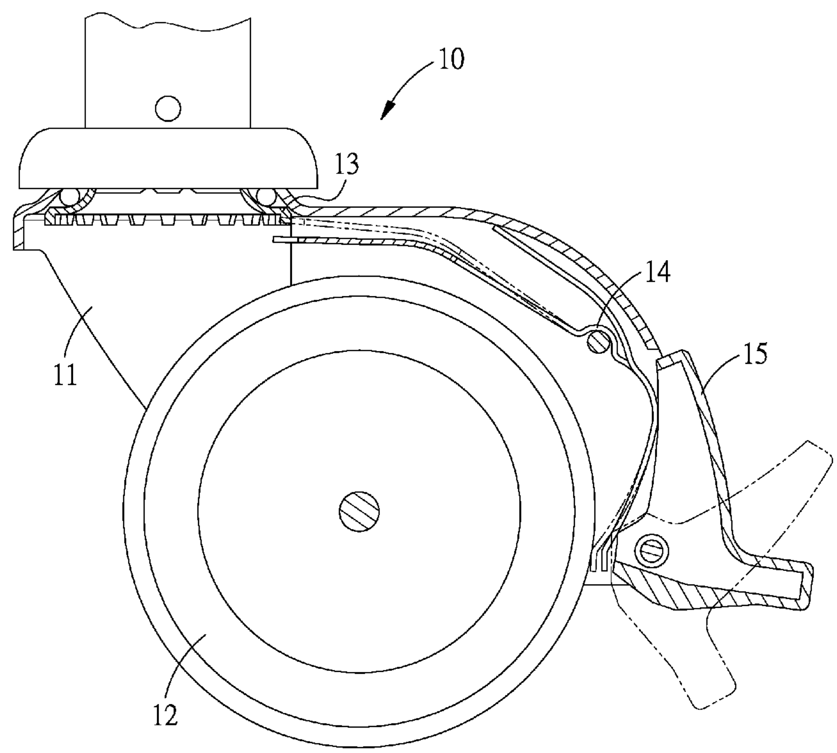
FIG. 1 shows a conventional case.
Figure 2:
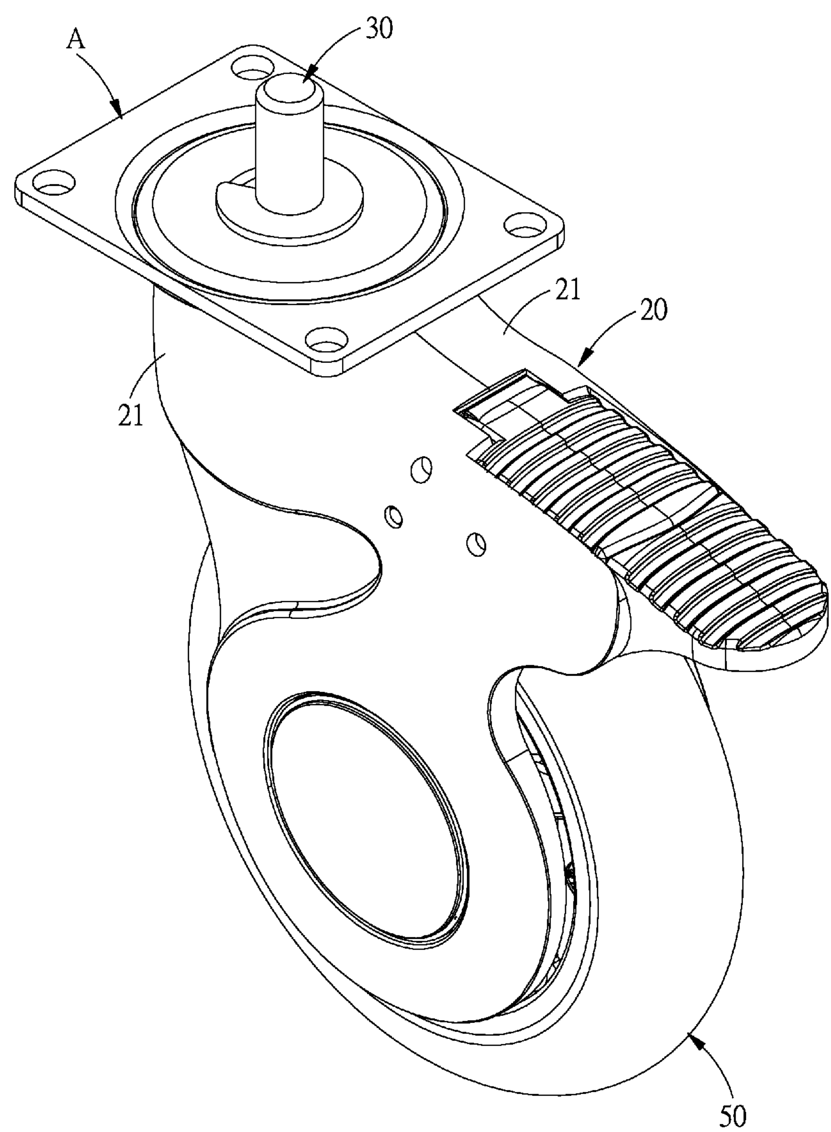
FIG. 2 shows a castor with separate brake device and brake release device in accordance with a preferred embodiment of the present invention.
Figure 3:
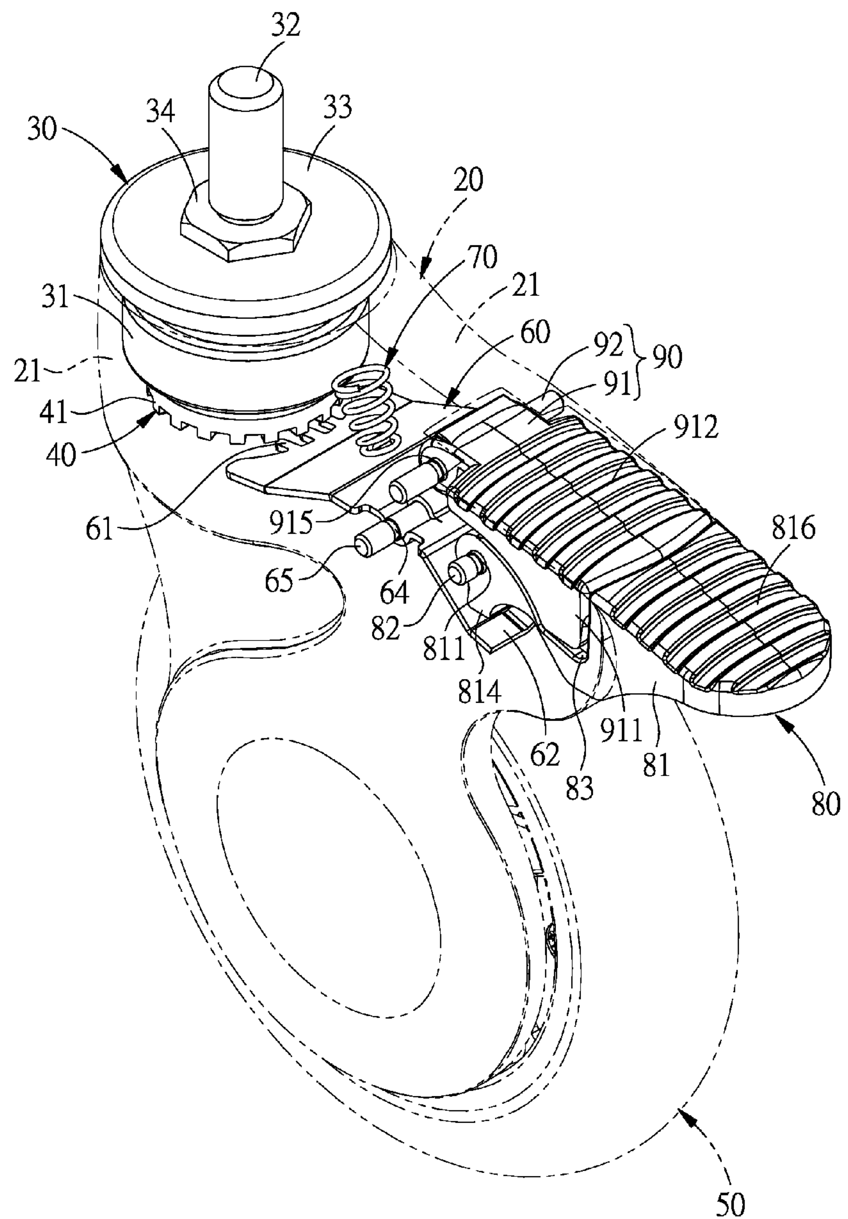
FIG. 3 is a perspective view of the castor with separate brake device and brake release device in accordance with the preferred embodiment of the present invention.
Figure 4:
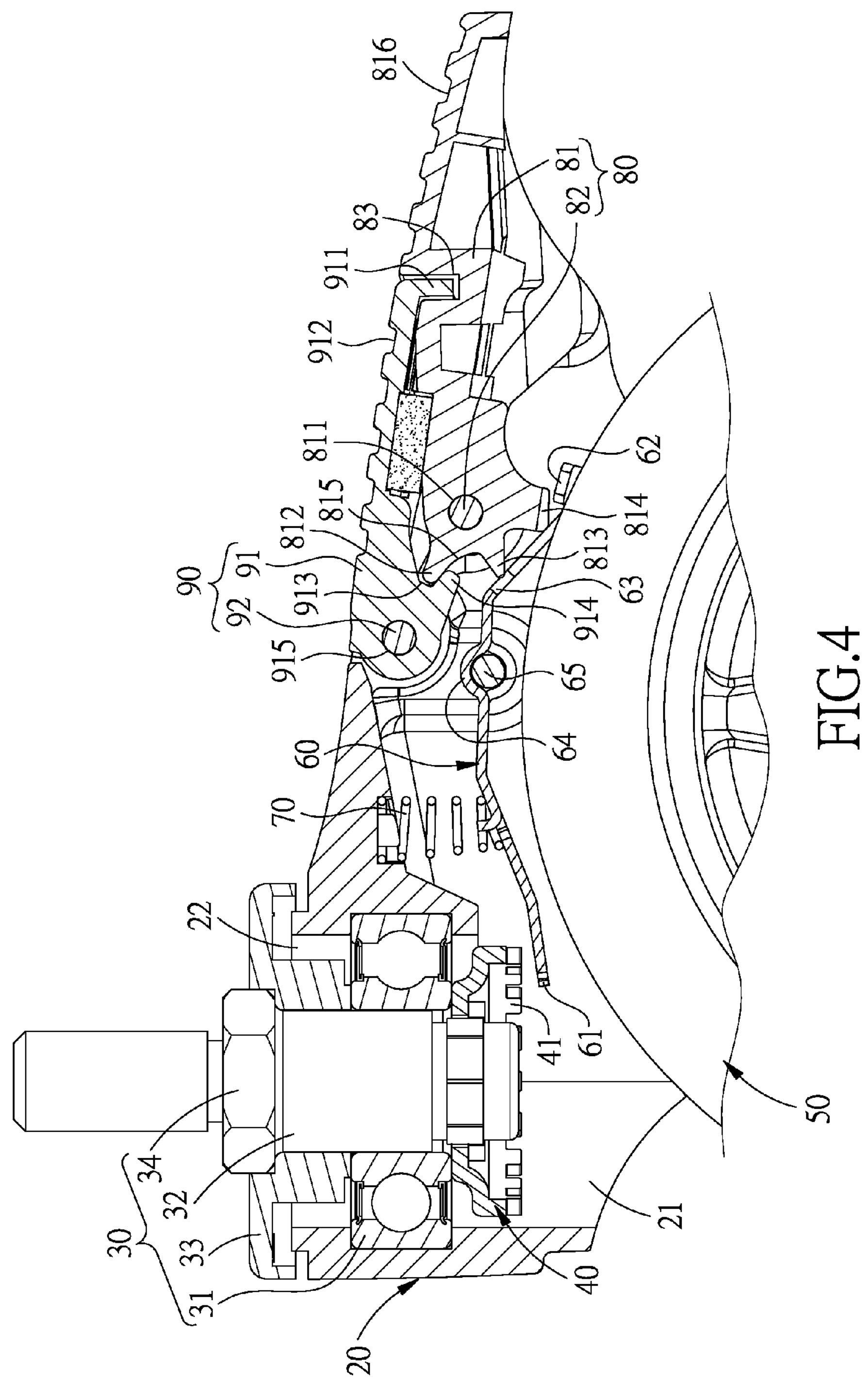
FIG. 4 is a cross sectional view of the castor with separate brake device and brake release device in accordance with the preferred embodiment of the present invention, wherein the brake has not been activated.

The present invention will be clearer from the following description when viewed together with the accompanying drawings, which show, for purpose of illustrations only, the preferred embodiment in accordance with the present invention.

Referring to FIGS. 2-7, a castor with separate brake device and brake release device in accordance with a preferred embodiment of the present invention comprises: a shell 20, a pivot unit 30, a toothed disc 40, a wheel 50, a brake piece 60, a spring 70, a brake unit 80, and a brake-release unit 90.

The shell 20 includes two lateral pieces 21 and an inserting hole 22, and the two lateral pieces 21 define an inner space of the shell 20.

The pivot unit 30 includes a bearing 31, a shaft 32, an upper cover 33 and a locking member 34. The bearing 31 is fixed in the inner space of the shell 20. The shaft 32 is pivotally inserted in the bearing 31 and has one end extending out of the inserting hole 22 of the shell 20. The upper cover 33 is inserted in the bearing 31, and one end of the upper cover 33 extends out of the inserting hole 22 and is positioned against the shell 20. The locking member 34 is fixed onto the shaft 32 extending out of the inserting hole 22 and positioned against the upper cover 33 to fix the upper cover 33. On the pivot unit 30 can also be provided a mounting plate A for mounting of other components.

The toothed disc 40 is fixed to another end of the shaft 32, so that it can rotate along with the shaft 32, and the toothed disc 40 includes a toothed portion 41.

The wheel 50 is pivotally disposed between the two lateral pieces 21 and has a thickness D. A central peripheral line L of the wheel 50 is located at ½ thickness D of the wheel 50, and two parts of the wheel 50 at both sides of the central peripheral line L are two lateral wheel portions 51.

The brake piece 60 has one end formed with a plurality of teeth 61 and another formed with two opposite brake portions 62. Between the two brake portions 62 is a slot 63, the two brake portions 62 each has one end in the form of an arc-shaped piece and a pivot portion 64 in the form of a hole formed between two ends of each of the brake portions 62, and the two arc-shaped pieces are opposite to each other. The brake piece 60 is pivotally disposed between the two lateral pieces 21 of the shell 20 by a first pivot 65 inserting through the two lateral pieces 21 and the pivot portion 64, in such a manner that the teeth 61 of the brake piece 60 is located corresponding to the toothed portion 41 of the toothed disc 40, and the two brake portions 62 are located corresponding to the two lateral wheel portions 51 of the wheel 50.

The spring 70 has one end positioned between the pivot portion 64 and the teeth 61 of the brake piece 60, and another end pressed against the shell 20.

The brake unit 80 includes a brake pedal 81 and a second pivot 82. One end of the brake pedal 81 is formed with a first pivot portion 811 in the form of a hole, a push portion 812, a restricting portion 813 in the form of a protruding tooth, and a press portion 814 in the form of a protruding tooth. Between the push portion 812 and the restricting portion 813 is a concave portion 815. Another end of the brake pedal 81 is formed with a plurality of anti-skid grooves 816. Between the two ends of the brake pedal 81 is a positioning concave 83. The brake pedal 81 is pivotally disposed between the two lateral pieces 21 by the second pivot 82 inserting through the two lateral pieces 21 and the first pivot portion 811, in such a manner that the press portion 814 of the brake pedal 81 is located corresponding to the brake portion 62 of the brake piece 60, and the push portion 812 and the restricting portion 813 are located corresponding to the slot 63, so that the brake pedal 81 is able to pivot about the first pivot portion 811.

The brake-release unit 90 includes a brake-release pedal 91 and a third pivot 92. The brake-release pedal 91 has one end formed with an L-shaped engaging portion 911 and another end formed with a second pivot portion 915 in the form of a hole. One surface of the brake-release pedal 91 is formed a plurality of anti-skid grooves 912, and another surface are formed with a notch portion 913 and protruding portion 914. The brake-release pedal 91 is pivotally disposed between the two lateral pieces 21 by the third pivot 92 inserting through the two lateral pieces 21 and the second pivot portion 915, so that the brake-release pedal 91 is able to pivot about the third pivot 92. The protruding portion 914 of the brake-release pedal 91 is located in the concave portion 815 of the brake pedal 81, and the engaging portion 911 of the brake-release pedal 91 is located corresponding to the positioning concave 83 of the brake pedal 81.

Figure 5:
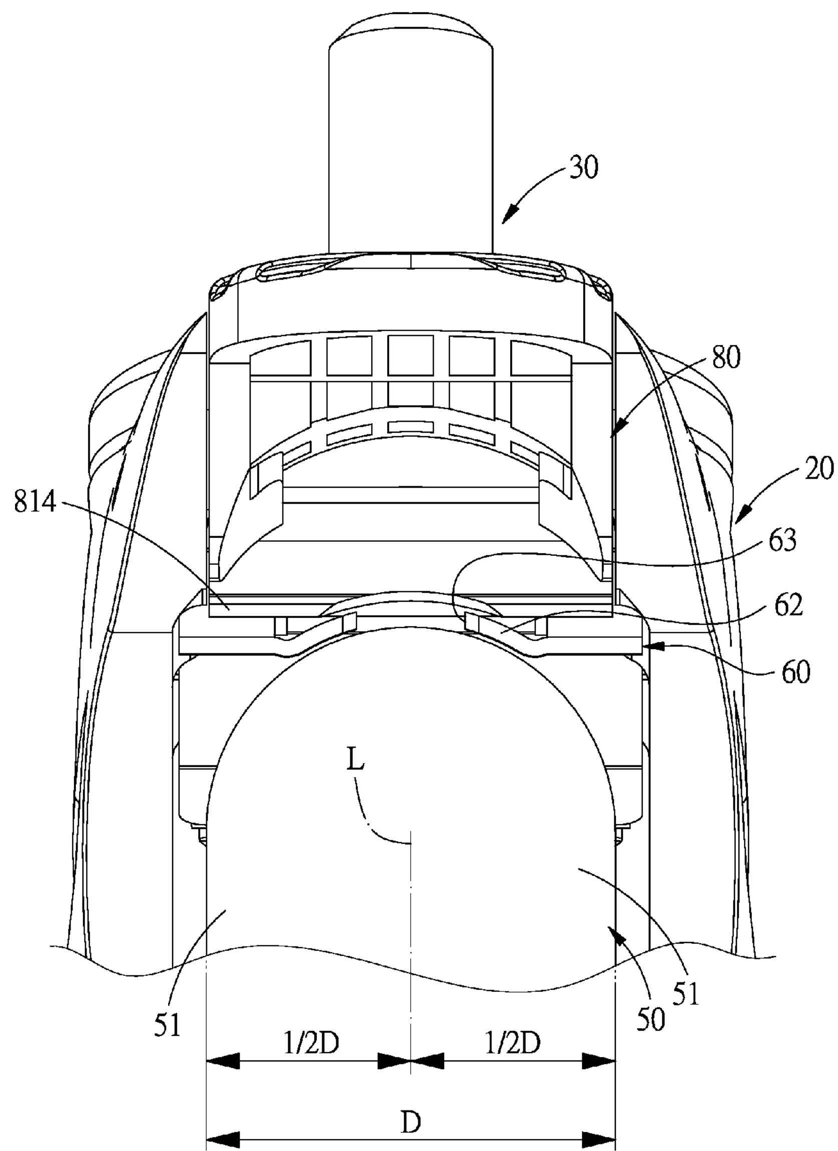
FIG. 5 is a side view showing the brake-deactivated state of the castor with separate brake device and brake release device in accordance with the preferred embodiment of the present invention.

As shown in FIGS. 2-5, under normal conditions and when the brake has not been activated, the press portion 814 of the brake pedal 81 does not come into contact with the brake piece 60, and the two brake portions 62 of the brake piece 60 do not come into contact with the wheel 50, as shown in FIG. 5, so that the wheel 50 is free to rotate.

Figure 6:
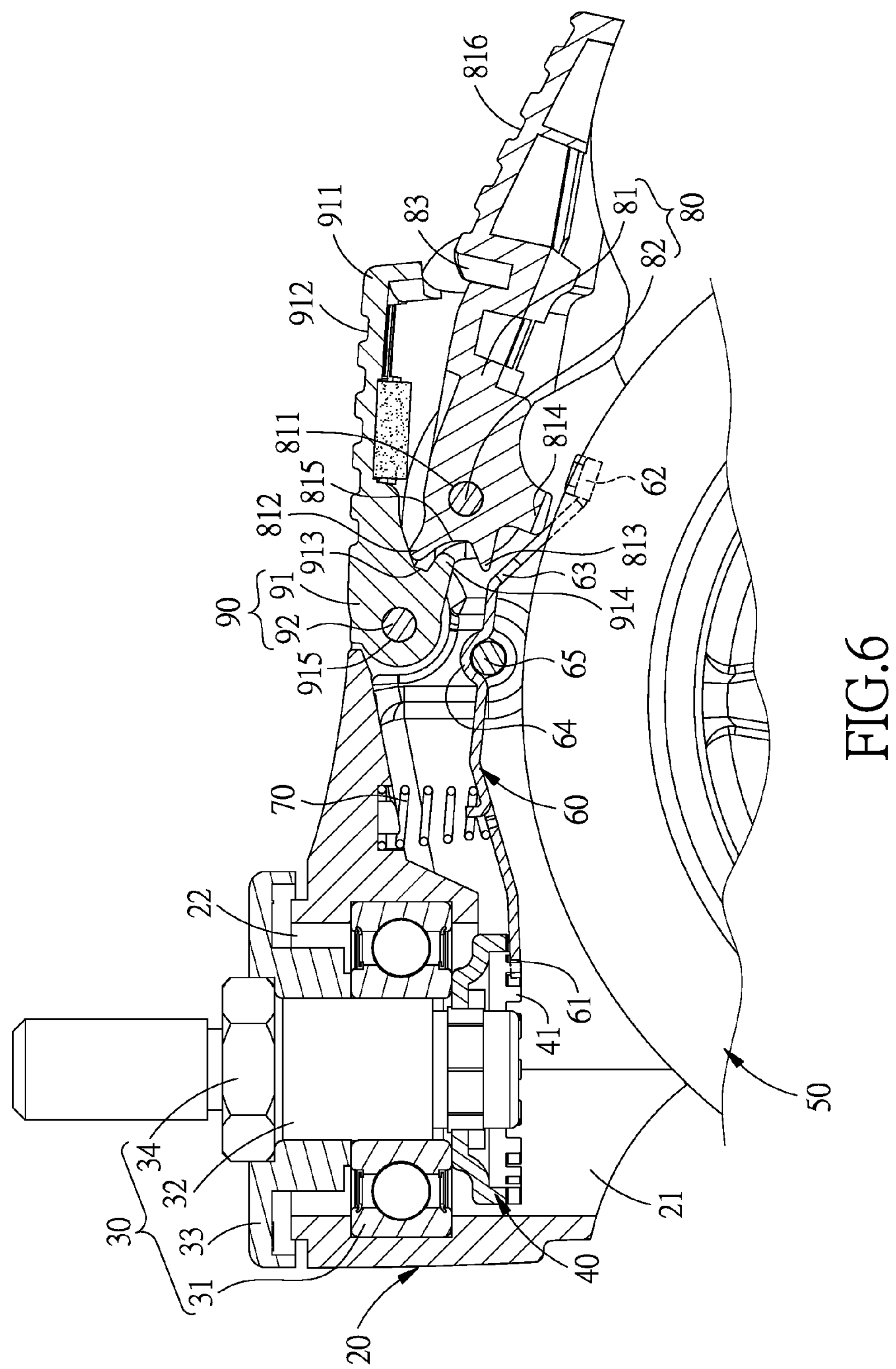
FIG. 6 is a cross sectional view of the castor with separate brake device and brake release device in accordance with the preferred embodiment of the present invention, wherein the brake has been activated.

When the wheel 50 is moved to a predetermined position and needs to be stopped there, the use can press down the brake pedal 81 of the brake unit 80 by stepping on the end of the brake pedal 81 where the anti-skid grooves 816 are located, so that the brake pedal 81 will rotate about the first pivot portion 811 to make the press portion 814 push the brake portions 62 against the lateral wheel portions 51 of the wheel 50, so as to stop the wheel 50. Meanwhile, another end of the brake piece 60 will tilt up to push the spring 70 and make the teeth 61 engage with the toothed portion 41 of the toothed disc 40 to stop the rotation of the toothed disc 40, and accordingly the shaft 32 is prevented from rotation, as shown in FIG. 6.

Since the brake portions 62 are pressed against the two lateral wheel portions 51 of the wheel 50 from both sides, the brake performance can be improved due to the fact that the brake piece 60 of the present invention provides a clamping brake force in addition to the friction brake force applied to the wheel 50. Similarly, the brake portions 62 are arc-shaped pieces to better fit the shape of the wheel 50, which provides a larger contact area and larger resultant friction brake force, resulting in better brake performance. Still because the brake portions 62 are pressed against the two lateral wheel portions 51 of the wheel 50, the brake-action caused abrasion will be located at both sides of the wheel 50 instead of along the central peripheral line L which rolls against the ground, so that the life of the wheel 50 can be extended.

Figure 7:
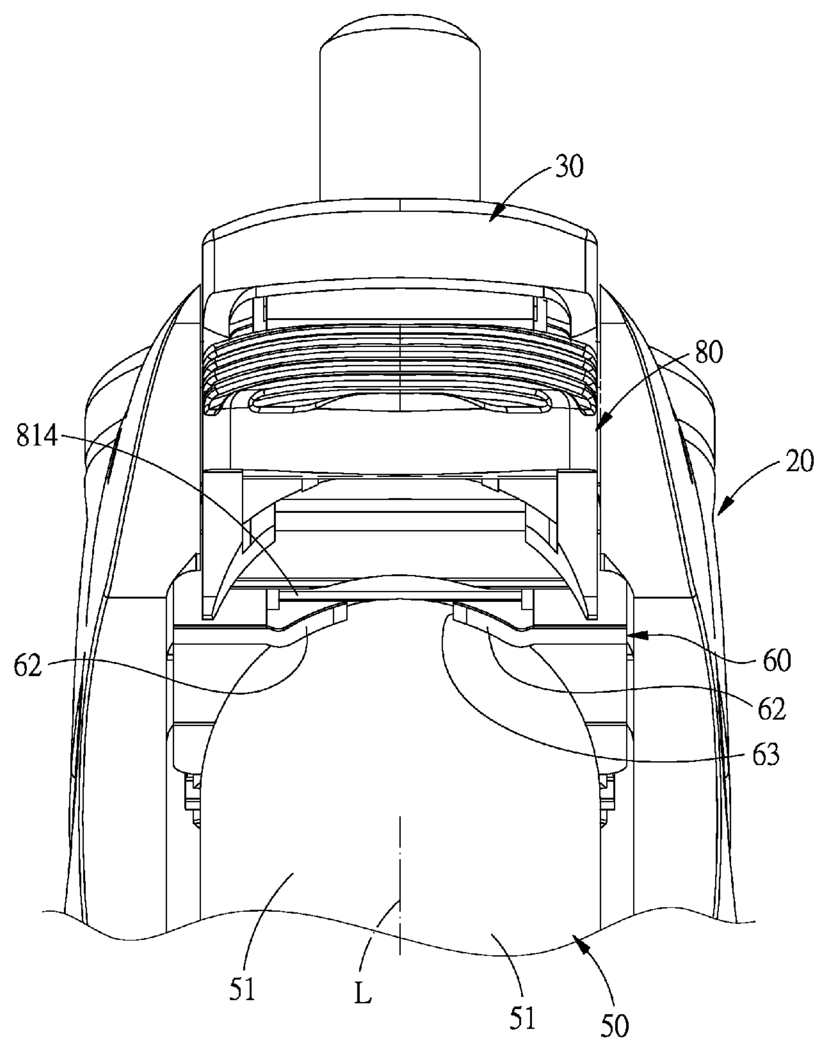
FIG. 7 is a side view showing the brake-activated state of the castor with separate brake device and brake release device in accordance with the preferred embodiment of the present invention.

Furthermore, the push portion 812 of the brake pedal 81 is pushed against the notch portion 913 of the brake-release pedal 91 to make the second pivot portion 915 of the brake-release pedal 91 pivot, and as a result, the engaging portion 911 of the brake-release pedal 91 pivots away from the positioning concave 83, as shown in FIG. 7, at this moment, the brake pedal 81 is pressed downward while the brake-release pedal 91 is pushed upward. Therefore, the brake pedal 81 and the brake-release pedal 91 present different angles, when the castor is in a brake-activated status, which makes it easier for the user to see the status of the castor (in brake position or non-brake position), and prevents confusion or accidental operation.

To release the brake, the user only needs to press down the brake-release pedal 91, the brake-release pedal 91 will push the push portion 812 of the brake pedal 81 through the notch portion 913 to make the brake pedal 81 rotate back to its original position. Meanwhile, the brake piece 60 is not pushed by the press portion 814 anymore, the spring 70 returns back, and the teeth 61 of the brake piece 60 disengage from the toothed disc 40, so that the brake action is released, and the wheel 50 is free to rotate again.

The brake pedal 81 and the brake-release pedal 91 are two separate members, while they are interactively linked by the push portion 812 and the notch portion 913, so as to ensure the accuracy of the brake operation. When a brake action is activated, the brake pedal 81 and the brake-release pedal 91 pivot away from each other in opposite directions, which makes it easier for the user to see the status of the castor (in brake position or non-brake position), and prevents confusion or accidental operation.

While we have shown and described various embodiments in accordance with the present invention, it is clear to those skilled in the art that further embodiments may be made without departing from the scope of the present invention.

What is claimed is:

1. A castor with separate brake device and brake release device, comprising:

a shell with two lateral pieces, a shaft pivotally inserted through the shell and having one end extending out of the shell, a toothed disc pivotally disposed between the two lateral pieces and fixed to another end of the shaft and including a toothed portion;

a brake piece with a pivot portion formed between two ends thereof and pivotally disposed between the two lateral pieces, a plurality of teeth at one end of the brake piece being located corresponding to the toothed portion of the toothed disc, and two brake portions at another end of the brake piece being located corresponding to the wheel;

a brake unit including a brake pedal, one end of the brake pedal being pivotally disposed between the two lateral pieces and formed with a push portion, a restricting portion in the form of a protruding tooth, and a press portion in the form of a protruding tooth, between the push portion and the restricting portion being formed a concave portion, between two ends of the brake pedal being formed a positioning concave, the press portion of the brake pedal being located corresponding to the brake portions of the brake piece; and a brake-release unit including a brake-release pedal, and one end of the brake-release pedal being pivotally disposed between the two lateral pieces, and another end of the brake-release pedal being formed with an L-shaped engaging portion, one surface of the brake-release pedal being formed with a notch portion and protruding portion, the protruding portion of the brake-release pedal being located in the concave portion of the brake pedal, and the engaging portion of the brake-release pedal being located corresponding to the positioning concave of the brake pedal.

2. The castor with separate brake device and brake release device as claimed in claim 1, wherein the wheel has a thickness, a central peripheral line of the wheel is located at ½ thickness of the wheel, and two parts of the wheel at both sides of the central peripheral line are two lateral wheel portions.

3. The castor with separate brake device and brake release device as claimed in claim 1 further comprises a spring which is disposed between the shell and the brake piece and has one end positioned between the pivot portion and the teeth of the brake piece, and another end pressed against the shell.

4. The castor with separate brake device and brake release device as claimed in claim 3, wherein the pivot portion of the brake piece is a hole, the brake piece is pivotally disposed between the two lateral pieces of the shell by a first pivot inserting through the two lateral pieces and the pivot portion.

5. The castor with separate brake device and brake release device as claimed in claim 1, wherein the two brake portions are located opposite to each other and each have one end in the form of an arc-shaped piece, and the two arc-shaped pieces are located opposite to each other.

6. The castor with separate brake device and brake release device as claimed in claim 1, wherein another end of the brake pedal is formed with a plurality of anti-skid grooves, and another surface of the brake-release pedal is formed with a plurality of anti-skid grooves.

7. The castor with separate brake device and brake release device as claimed in claim 1, wherein the shell includes an inserting hole, and the two lateral pieces define an inner space of the shell, a bearing is fixed in the inner space of the shell, the shaft is pivotally inserted in the bearing and has one end extending out of the inserting hole of the shell, the upper cover is inserted in the bearing, and one end of the upper cover extends out of the inserting hole and is positioned against the cover, and a locking member is fixed onto the shaft extending out of the inserting hole and positioned against the upper cover.

8. The castor with separate brake device and brake release device as claimed in claim 1, wherein the one end of the brake pedal is formed with a first pivot portion in the form of a hole, and the brake pedal is pivotally disposed between the two lateral pieces by a second pivot inserting through the two lateral pieces and the first pivot portion.

9. The castor with separate brake device and brake release device as claimed in claim 1, wherein the one end of the brake-release pedal pivotally disposed between the two lateral pieces is formed with a second pivot portion in the form of a hole, and the brake-release pedal is pivotally disposed between the two lateral pieces by a third pivot inserting through the two lateral pieces and the second pivot portion.

10. The castor with separate brake device and brake release device as claimed in claim 1, wherein a slot is formed between the two brake portions of the brake piece, and the push portion and the restricting portion are located corresponding to the slot.

* * * * *